(12) United States Patent
Prager et al.

(10) Patent No.: US 10,946,963 B2
(45) Date of Patent: Mar. 16, 2021

(54) EXTERNAL CONTAINMENT APPARATUS FOR UNMANNED AERIAL VEHICLE

(71) Applicant: Wing Aviation LLC, Mountain View, CA (US)

(72) Inventors: André Prager, Sunnyvale, CA (US); Kyle Liske, San Francisco, CA (US); Trevor Shannon, Mountain View, CA (US); Zhefei Li, Sunnyvale, CA (US)

(73) Assignee: WING AVIATION LLC, Mountain View, CA (US)

( * ) Notice: Subject to any disclaimer, the term of this patent is extended or adjusted under 35 U.S.C. 154(b) by 365 days.

(21) Appl. No.: 16/108,043

(22) Filed: Aug. 21, 2018

(65) Prior Publication Data

US 2020/0062399 A1     Feb. 27, 2020

(51) Int. Cl.
| | | |
|---|---|---|
| *B64D 1/22* | (2006.01) | |
| *B64C 39/02* | (2006.01) | |
| *B64D 1/10* | (2006.01) | |

(52) U.S. Cl.
CPC .............. *B64D 1/22* (2013.01); *B64C 39/024* (2013.01); *B64D 1/10* (2013.01); *B64C 2201/128* (2013.01)

(58) Field of Classification Search
CPC ............................ B64D 1/10; B64C 2201/128
See application file for complete search history.

(56) References Cited

U.S. PATENT DOCUMENTS

| | | | |
|---|---|---|---|
| 8,876,057 B2 | 11/2014 | Alber et al. | |
| 2011/0084162 A1 | 4/2011 | Goossen et al. | |
| 2014/0217230 A1 | 8/2014 | Helou, Jr. | |
| 2016/0236778 A1* | 8/2016 | Takayama | ............... B64C 39/02 |
| 2017/0203843 A1* | 7/2017 | Chan | ..................... B64C 39/024 |
| 2017/0253334 A1 | 9/2017 | Takayama et al. | |
| 2018/0072404 A1 | 3/2018 | Prager et al. | |
| 2018/0072417 A1 | 3/2018 | Shannon et al. | |
| 2018/0072418 A1 | 3/2018 | Shannon et al. | |
| 2018/0072420 A1 | 3/2018 | Prager et al. | |
| 2018/0072422 A1 | 3/2018 | Shannon et al. | |

FOREIGN PATENT DOCUMENTS

RU     2186004 C1     7/2002

OTHER PUBLICATIONS

International Search Report and Written Opinion, dated Nov. 14, 2019, for corresponding International Patent Application No. PCT/US2019/047271, 7 pages.

* cited by examiner

*Primary Examiner* — Richard G Davis
(74) *Attorney, Agent, or Firm* — Christensen O'Connor Johnson Kindness PLLC

(57) ABSTRACT

An apparatus and method for transporting a payload are disclosed herein. In embodiments, a system for transporting a payload includes an unmanned aerial vehicle (UAV) including a payload coupling apparatus, and a containment apparatus having an aerodynamic shape and including first and second openings. The containment apparatus is located external to the UAV and attaches to an underside of the UAV. The payload coupling apparatus passes through the first and second openings of the containment apparatus to couple with the payload, and the payload passes through the second opening to be positioned inside or outside the containment apparatus.

20 Claims, 16 Drawing Sheets

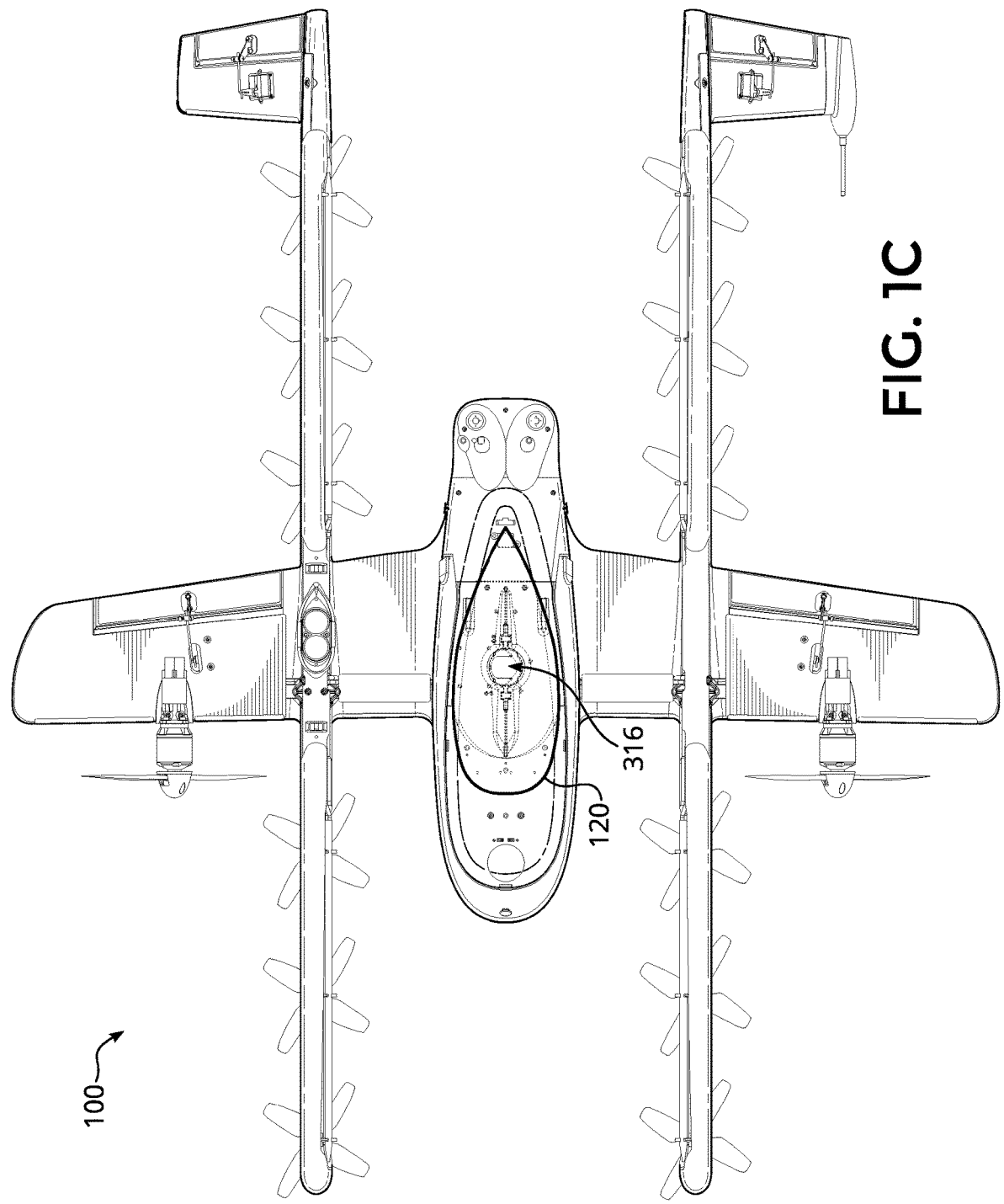

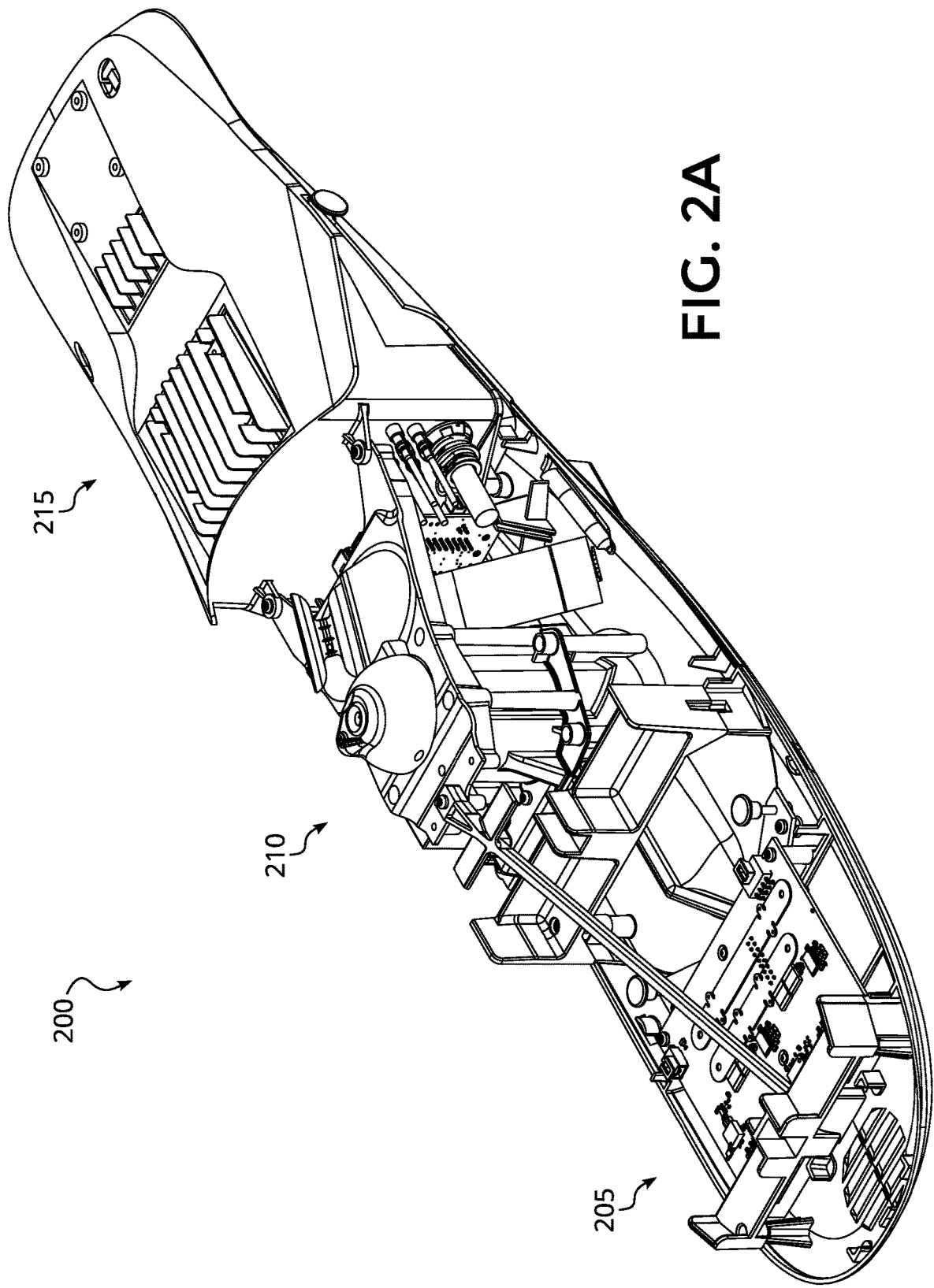

EXTERNAL CONTAINMENT APPARATUS FOR UNMANNED AERIAL VEHICLE

TECHNICAL FIELD

This disclosure relates generally to the field of unmanned aerial vehicles.

BACKGROUND INFORMATION

An unmanned vehicle, which may also be referred to as an autonomous vehicle, is a vehicle capable of travel without a physically-present human operator. An unmanned vehicle may operate in a remote-control mode, in an autonomous mode, or in a partially autonomous mode.

When an unmanned vehicle operates in a remote-control mode, a pilot or driver than is at a remote location can control the unmanned vehicle via commands that are sent to the unmanned vehicle via a wireless link. When the unmanned vehicle operates in autonomous mode, the unmanned vehicle typically moves based on pre-programmed navigation waypoints, dynamic automation systems, or a combination of these. Further, some unmanned vehicles can operate in both a remote-control mode and an autonomous mode, and in some instance may do so simultaneously. For instance, a remote pilot or driver may wish to leave navigation to an autonomous system while manually performing another task, such as operating a mechanical system for picking up objects, as an example.

Various types of unmanned vehicles exist for various different environments. For instance, unmanned vehicles exist for operation in the air, on the ground, underwater, and in space. Unmanned aerial vehicles (UAVs) or drones are becoming more popular in general. Designs that improve the efficiency and suitability of UAVs for commercial use will expand their mission capabilities.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. Not all instances of an element are necessarily labeled so as not to clutter the drawings where appropriate. The drawings are not necessarily to scale, emphasis instead being placed upon illustrating the principles being described.

FIG. 1C is a bottom plan view of the UAV of FIG. 1A, according to an embodiment of the disclosure.

FIG. 2A is a perspective view illustration of an assembled modular fuselage of the UAV of FIG. 1A, according to an embodiment of the disclosure.

DETAILED DESCRIPTION

Embodiments of a system, apparatus, and method for transporting certain types of payloads using unmanned aerial vehicles are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Embodiments described herein include an unmanned aerial vehicle (UAV), which refers to any autonomous or semi-autonomous vehicle that is capable of performing some functions without a physically present human pilot. A UAV can take various forms. For example, a UAV may take the form of a fixed-wing aircraft, a glider aircraft, a tail-sitter aircraft, a jet aircraft, a ducted fan aircraft, a lighter-than-air dirigible such as a blimp or steerable balloon, a rotorcraft such as a helicopter or multicopter, and/or an ornithopter, among other possibilities. Further, the terms "drone," "unmanned aerial vehicle system" (UAVS), or "unmanned aerial system" (UAS) may also be used to refer to a UAV.

Figure 1A:
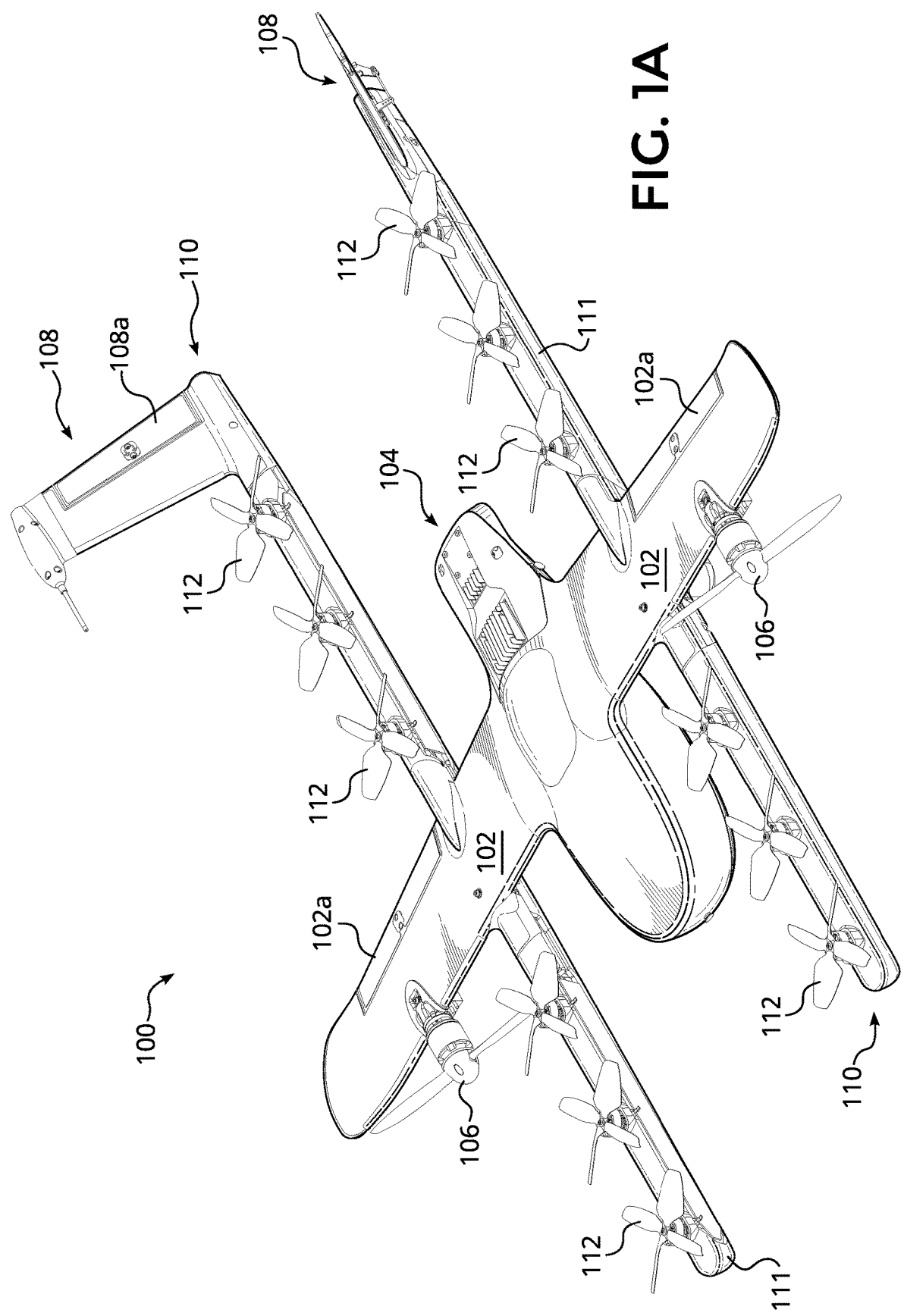
FIG. 1A is a perspective view illustration of an unmanned aerial vehicle (UAV), according to an embodiment of the disclosure.
Figure 1B:
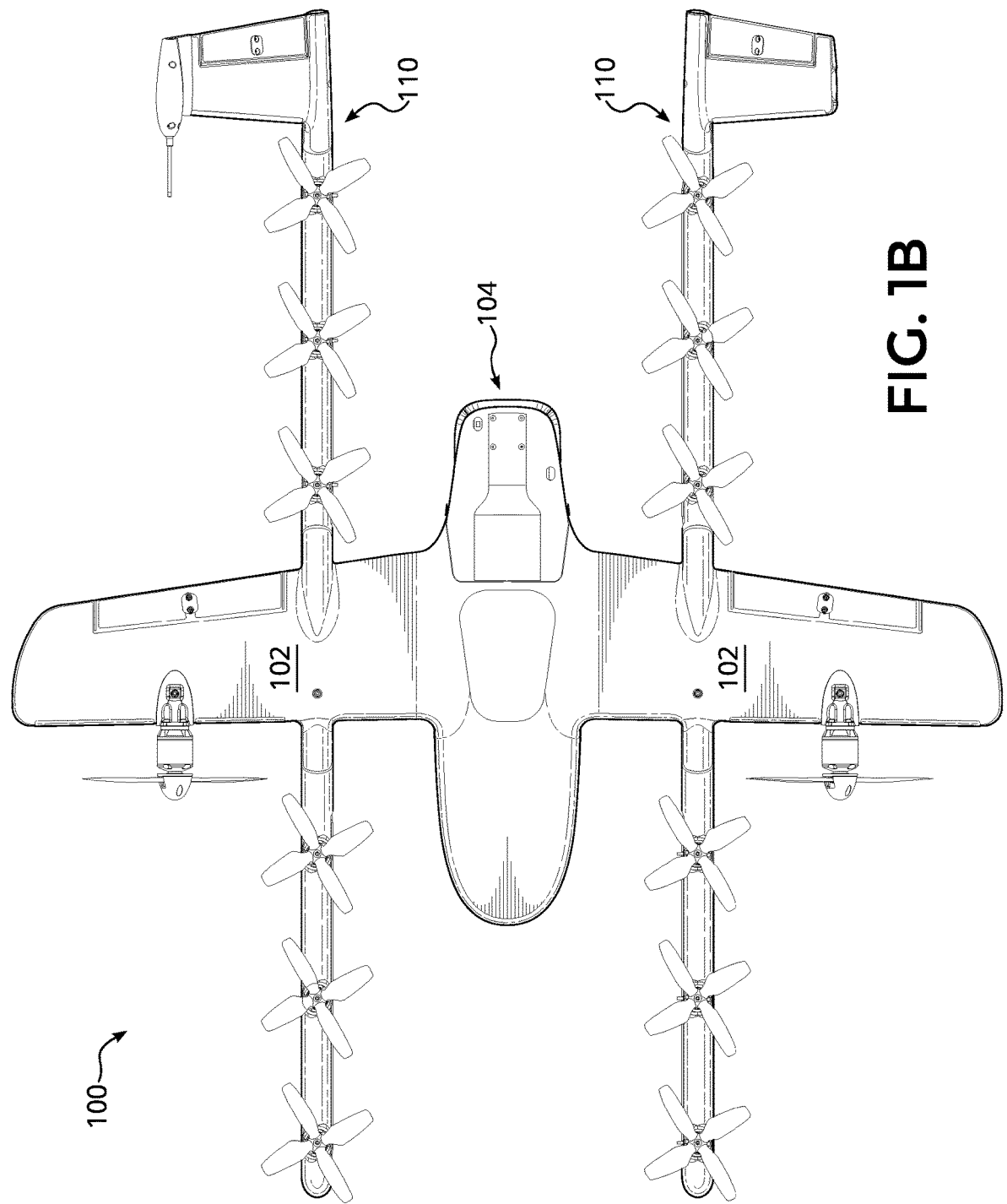
FIG. 1B is a top plan view of the UAV of FIG. 1A, according to an embodiment of the disclosure.

FIG. 1A is a perspective view illustration of a UAV 100 having a modular fuselage, according to an embodiment of the disclosure. FIG. 1B is a top plan view of UAV 100 and FIG. 1C is a bottom plan view of the same. FIGS. 1A-C illustrate an example of a fixed-wing UAV 100, which may also be referred to as an airplane, an aeroplane, a glider, or a plane, among other possibilities. The fixed-wing UAV 100, as the name implies, has a wing assembly 102 that generates lift based on the wing shape and the vehicle's forward airspeed. For instance, wing assembly 102 may have an airfoil-shaped cross section to produce an aerodynamic lift force on the UAV 100.

As depicted, UAV 100 also includes a modular fuselage 104. Modular fuselage 104 includes a battery module, an avionics module, a mission payload module, and a fuselage cover. In some embodiments of the present disclosure, these modules are detachable from each other and mechanically securable to each other to contiguously form at least a portion of the fuselage or UAV main body.

The battery module houses one or more batteries for powering UAV 100. The avionics module houses flight control circuitry of UAV 100, which may include a processor and memory, communication electronics, antennas (e.g., cellular transceiver, wifi transceiver, etc.), and various sensors (e.g., global positioning sensor, an inertial measurement unit (IMU), etc.). The mission payload module houses equipment associated with a mission of UAV 100. For example, the mission payload module may include a payload actuator for holding and releasing an externally attached payload. In this embodiment, a mission of UAV 100 may be payload delivery. In another embodiment, the mission payload module may include a camera/sensor equipment holder for carrying camera/sensor equipment (e.g., camera, lenses, radar, lidar, pollution monitoring sensors, weather monitoring sensors, etc.). In this embodiment, a mission of UAV 100 may be aerial imagery. In yet another embodiment, the mission payload module may include an additional battery holder to house additional or larger batteries for extended flight times. In this embodiment, a mission of UAV 100 may be general flight. Of course, mission payload module may provide mix-use payload capacity (e.g., additional battery and camera equipment) for a variety of mix-use missions. The modular fuselage of UAV 100 may also include landing gear and/or skid plates for controlled take-offs and landings.

The illustrated embodiment of UAV 100 further includes forward propulsion units 106 positioned on wing assembly 102, which can each include a motor, shaft, and propeller, for propelling UAV 100. The illustrated embodiment of UAV 100 further includes two boom assemblies 110 that secure to wing assembly 102. In one embodiment, wing assembly 102 includes a wing spar disposed within a wing foil. The wing spar may be a tubular rod extending along the internal length of the wing foil and provides a main structural member that connects wing assembly 102 to modular fuselage 104 and to which boom assemblies 110 mount.

The illustrated embodiments of boom assemblies 110 each include a boom 111, vertical propulsion units 112, printed circuit boards 113, and stabilizers 108. Vertical propulsion units 112 can each include a motor, shaft, and propeller, for providing vertical propulsion. Vertical propulsion units 112 may be used during a hover mode wherein UAV 110 is descending (e.g., to a delivery location) or ascending (e.g., following a delivery). Stabilizers 108 (or fins) may be included with UAV 100 to stabilize the UAV's yaw (left or right turns) during flight. In some embodiments, UAV 100 may be configured to function as a glider. To do so, UAV 100 may power off its propulsion units and glide for a period of time.

Referring to FIG. 1C, UAV 100 may connect to an external containment apparatus 120, in accordance with some embodiments of the present disclosure. External containment apparatus 120 may be located external to and on the underside of UAV 100, on a side of the UAV 100 proximate to the modular fuselage 104. External containment apparatus 120 may also be referred to as an external pod, external container, external payload holder, aerodynamic payload transporter, and/or the like. The external containment apparatus 120 is discussed in greater detail below.

During flight, UAV 100 may control the direction and/or speed of its movement by controlling its pitch, roll, yaw, and/or altitude. For example, the stabilizers 108 may include one or more rudders 108a for controlling the UAV's yaw, and wing assembly 102 may include elevators for controlling the UAV's pitch and/or ailerons 102a for controlling the UAV's roll. As another example, increasing or decreasing the speed of all the propellers simultaneously can result in UAV 100 increasing or decreasing its altitude, respectively.

Many variations on the illustrated fixed-wing UAV are possible. For instance, fixed-wing UAVs may include more or fewer propellers, and/or may utilize a ducted fan or multiple ducted fans for propulsion. Further, UAVs with more wings (e.g., an "x-wing" configuration with four wings), are also possible. Although FIGS. 1A-1C illustrate just one wing assembly 102, just two boom assemblies 110, two forward propulsion units 106, and six vertical propulsion units 112 per boom assembly 110, it should be appreciated that other variants of UAV 100 may be implemented with more or less of these components. For example, UAV 100 may include two wing assemblies 102, four boom assemblies 110, and more or less propulsion units (forward or vertical).

It should be understood that references herein to an "unmanned" aerial vehicle or UAV can apply equally to autonomous and semi-autonomous aerial vehicles. In an autonomous implementation, all functionality of the aerial vehicle is automated; e.g., pre-programmed or controlled via real-time computer functionality that responds to input from various sensors and/or pre-determined information. In a semi-autonomous implementation, some functions of an aerial vehicle may be controlled by a human operator, while other functions are carried out autonomously. Further, in some embodiments, a UAV may be configured to allow a remote operator to take over functions that can otherwise be controlled autonomously by the UAV. Yet further, a given type of function may be controlled remotely at one level of abstraction and performed autonomously at another level of abstraction. For example, a remote operator could control high level navigation decisions for a UAV, such as specifying that the UAV should travel from one location to another (e.g., from a warehouse in a suburban area to a delivery address in a nearby city), while the UAV's navigation system autonomously controls more fine-grained navigation decisions, such as the specific route to take between the two locations, specific flight controls to achieve the route and avoid obstacles while navigating the route, and so on.

Figure 2B:
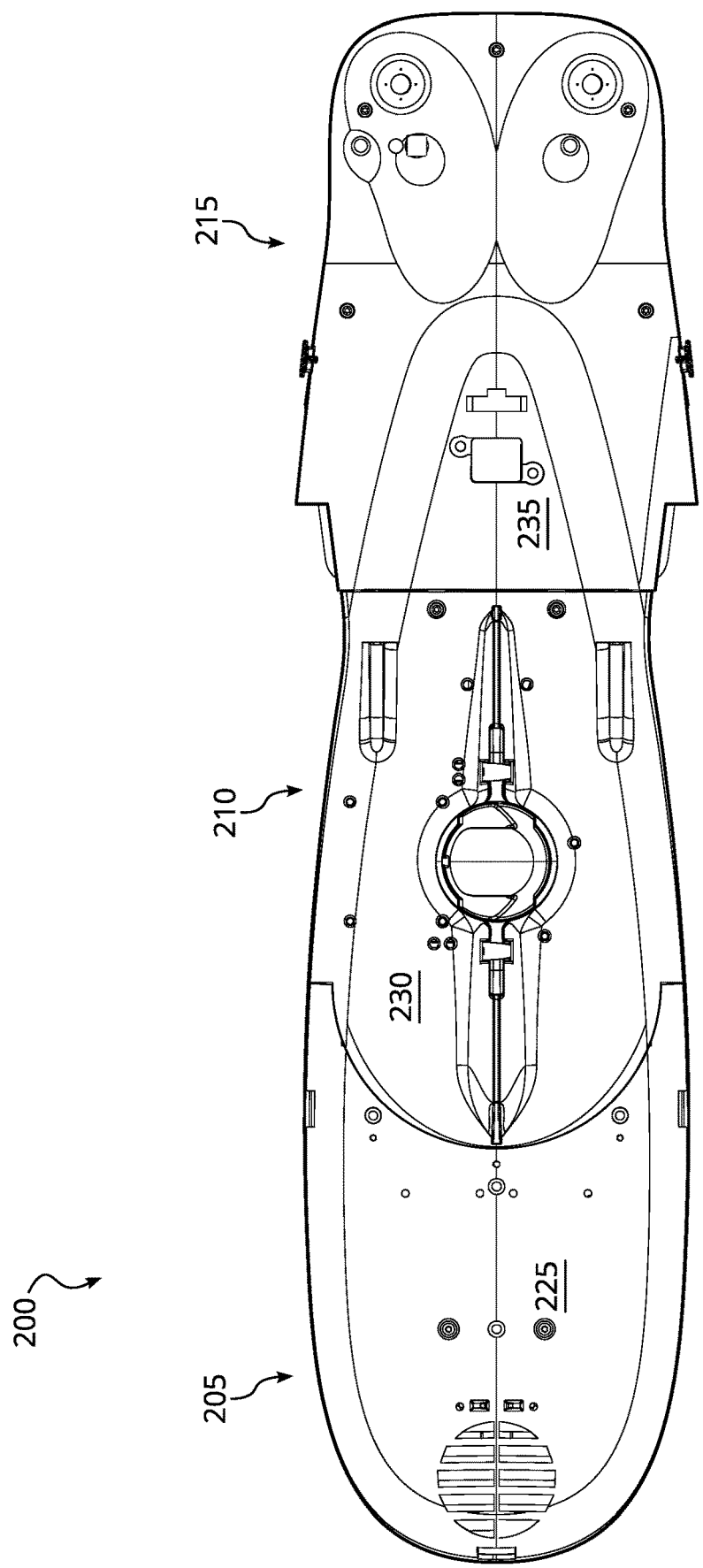
FIG. 2B is a bottom plan view of the assembled modular fuselage of FIG. 2A, according to an embodiment of the disclosure.

FIGS. 2A-2B illustrate a modular fuselage 200, in accordance with an embodiment of the disclosure. Modular fuselage 200 may comprise a possible implementation of modular fuselage 104 illustrated in FIGS. 1A-1C. FIG. 2A is a perspective view illustration of an assembled modular fuselage 200. FIG. 2B is a bottom plan view of the assembled modular fuselage 200.

Referring to FIGS. 2A and 2B, the illustrated embodiment of modular fuselage 200 includes a battery module 205 for housing a battery to power a UAV, a mission payload module 210 that houses equipment associated with a mission of the UAV, and an avionics module 215 for housing flight control circuitry of the UAV. Battery module 205, mission payload module 210, and avionics module 215 are shaped to secure to each other to form a contiguous and operational fuselage separate from being mechanically secured to wing assembly 102 or boom assemblies 110. This enables modular fuselage 200 to be assembled and operationally tested in isolation to the aerodynamic structures and systems on wing assembly 102 and boom assemblies 110. The modularity further enables the easy replacement of worn out or damaged modules, swapping modules (e.g., mission payload module) for a given UAV mission or flight, or updating particular modules without having to replace the entire UAV.

In the illustrated embodiment, the sections of modular fuselage 200 are mechanically secured to each other using, for example, mechanical fasteners. When mated and secured together, battery module 205, mission payload module 210, and avionics module 215 may form a contiguous fuselage with smooth continuous outer surfaces. For example, as shown in FIG. 2B, undersides 225, 230, and 235, of battery module 205, mission payload module 210, and avionics module 215, respectively, have mating curvatures that form a single, contiguous, aerodynamic surface of the fuselage when mechanically secured to each other. In one embodiment, undersides 225, 230, and 235 may also serve as skid plates.

In embodiments in which UAV 100 may be configured to transport payloads, such payloads may be transported within external containment apparatus 120. In some embodiments, payloads associated with external containment apparatus 120 may comprise payloads that are too large, bulky, irregularly shaped, and/or otherwise unsuitable to fit inside UAV 100 and/or payloads having a non-aerodynamic shape. Examples of payloads for transport within external containment apparatus 120 may include, without limitation, French baguettes, pizza boxes, shoe boxes, floral arrangements, bats, tennis rackets, or the like.

Figure 3A:
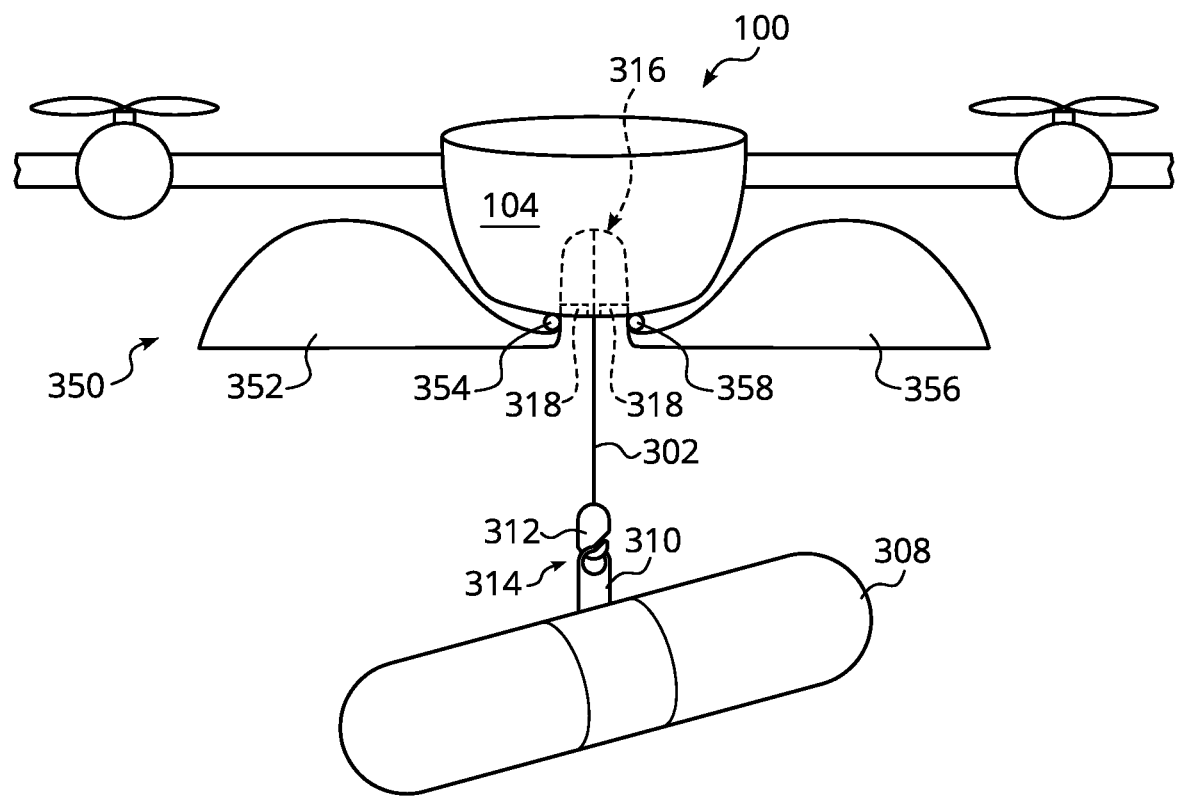
FIG. 3A depicts a front view of the UAV with an external containment apparatus in a first position and payload attached to the UAV via a payload coupling apparatus, according to an embodiment of the disclosure.

FIGS. 3A-5B illustrate an example depiction of a payload 308 in association with an external containment apparatus 350, in accordance with some embodiments of the present disclosure. FIG. 3A depicts a front view of the UAV 100 with the external containment apparatus 350 in a first position (e.g., open position) and payload 308 attached to UAV 100 via a payload coupling apparatus 314. FIG. 3B depicts a side view of the UAV 100, external containment apparatus 350, and payload 308 illustrated in FIG. 3A. FIGS. 3A-3B illustrate the payload 308 in the process of being pulled up to the UAV 100 to be encapsulated by the external containment apparatus 350 after payload pick-up and/or being let away from the UAV 100 to be delivered after arrival at the delivery location.

In some embodiments, one end of payload coupling apparatus 314 may be connected to a tether 302 and the opposite end of payload coupling apparatus 314 may detachably couple with payload 308. Payload coupling apparatus 314 may include a payload loop 310 and a capsule 312. Payload loop 310 is configured to encircle, secure, or otherwise attach to the payload 308 (e.g., via a friction or compression fit) and which may selectively attach and detach from payload 308 at pick-up and delivery, respectively. Capsule 312 is configured to connect the payload loop 310 to the tether 302. Capsule 312 may be configured to be particularly shaped to be at least partially received within receptacle 316 and/or facilitate proper orientation of the payload 308 to the external containment apparatus 350. For example, payload loop 310 may include a tab that couples to a hook included in the capsule 312, payload loop 310 and capsule 312 may include complementary securement mechanisms to secure to each other, or the like.

Tether 302 is coupled to a spool and winch (not shown) included in UAV 100. Tether 302 may be pulled in or let out, via selective actuation of the spool and winch, to position payload 308 relative to the external containment apparatus 120. Tether 203 may comprise a cable, wire, rope, or the like.

When tether 302 is in a fully pulled in position, at least a portion of the payload coupling apparatus 314 is configured to be housed or positioned within receptacle 316. Receptacle 316 is configured to be space within UAV 100 and with an opening on the underside of the UAV 100, in which the opening aligns with the external containment apparatus 350 as described in detail below. In some embodiments, a payload latch 406 may be included within the receptacle 316 to facilitate securing the payload 308 in one or more positions (e.g., securing payload 308 while inside external containment apparatus 350 and releasing payload 308 during delivery).

Figure 3B:
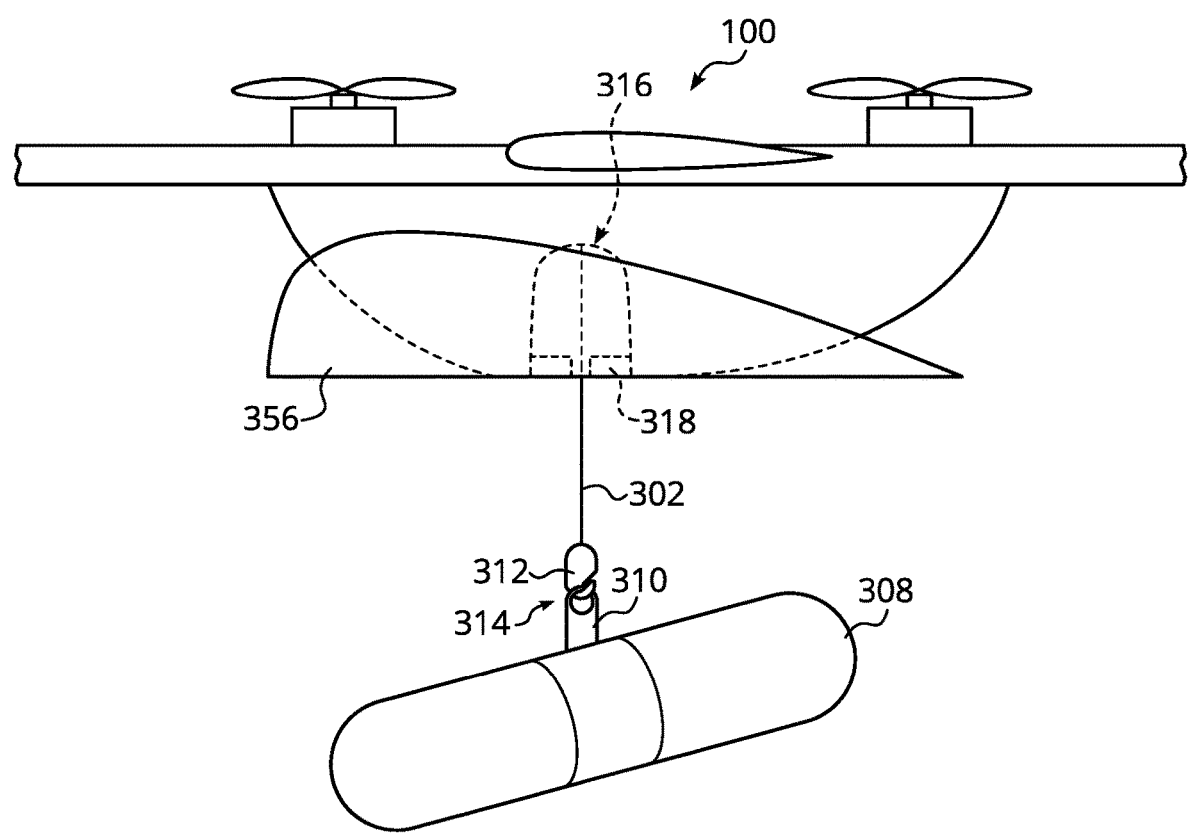
FIG. 3B depicts a side view of the UAV, external containment apparatus, and payload illustrated in FIG. 3A, according to an embodiment of the disclosure.
Figure 5A:
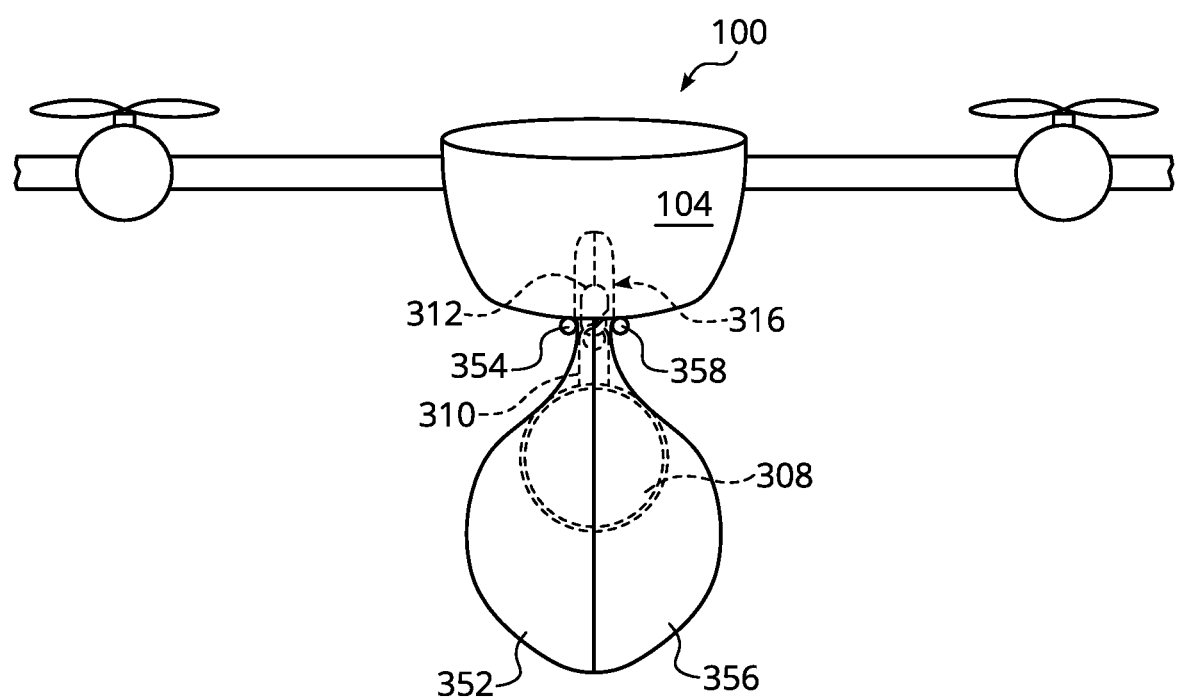
FIG. 5A depicts a front view of the UAV with the external containment apparatus in a second position and payload attached to the UAV, according to an embodiment of the disclosure.
Figure 5B:
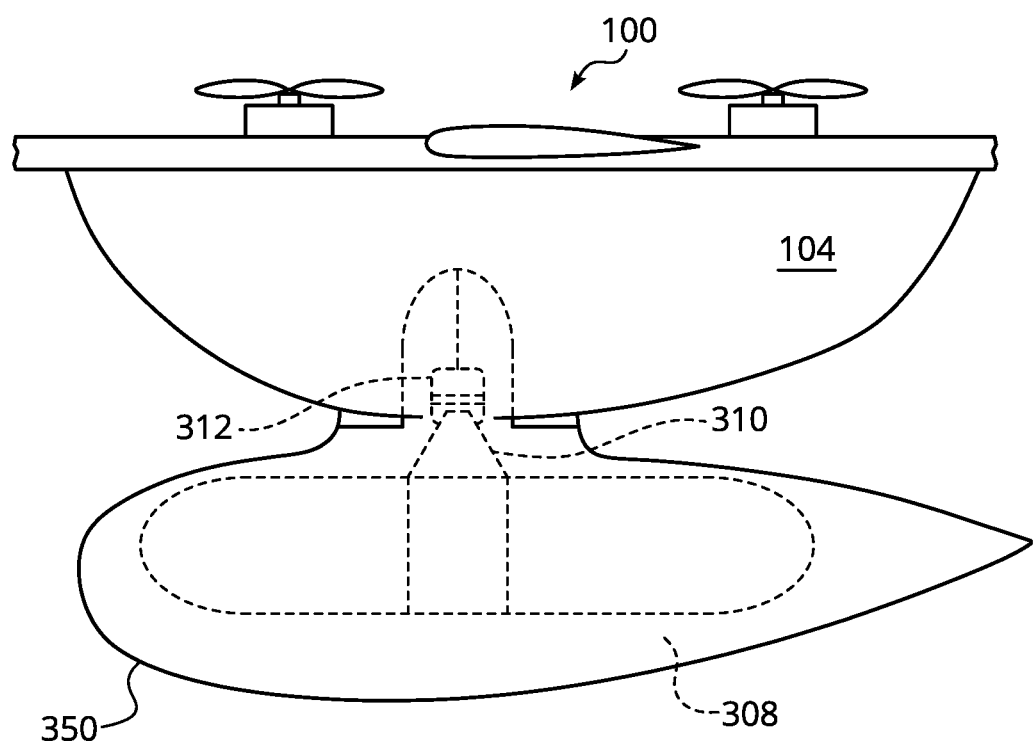
FIG. 5B depicts a side view of the UAV, external containment apparatus, and payload illustrated in FIG. 5A, according to an embodiment of the disclosure.

In some embodiments, external containment apparatus 350 may comprise first and second portions 352, 356, each of the first and second portions 352, 356 pivotally attached to the underside of UAV 100 (e.g., on either side of the opening of receptacle 316). A first hinge 354 may be disposed between first portion 352 and the underside of UAV 100, and second hinge 358 may be disposed between second portion 356 and the underside of UAV 100. First and second hinges 354, 358 may be configured to permit first and second portions 352, 356 to be positioned in at least two different configurations: a first position/configuration (e.g., open position)—as illustrated in FIGS. 3A-3B—and a second position/configuration (e.g., closed position)—as illustrated in FIGS. 5A-5B. First and second portions 352, 356 arranged in the first position/configuration may be configured to enable UAV 100 to land on its fuselage bottom (e.g., land on one or more of undersides 225, 230, 235).

External containment apparatus 350 may have an aerodynamic external shape and a hollow or empty internal space. First and second portions 352, 356 may comprise two halves of an aerodynamically shaped shell or enclosure for the payload 308. As an example, the aerodynamic shape of external containment apparatus 350 may comprise a teardrop shape, teardrop aerofoil shape, substantially teardrop shape (e.g., one or more sides may be elongated or "stretched out" from an ideal teardrop shape), a shape configured to reduce air drag, and/or the like.

External containment apparatus 350 may comprise plastic, fiberglass, Styrofoam, or a lightweight material having sufficient stiffness to maintain the aerodynamic exterior shape. The size of external containment apparatus 350 may be configured to be at least large enough to encompass or hold payload 308 within its interior space, as illustrated in FIGS. 5A-5B. In FIGS. 5A-5B, first and second portions 352, 356 are pivoted downward and toward each other, thereby bringing the two halves together into the second position. In the second position, the aerodynamic shape of the external containment apparatus 350 can be more readily seen. Depending on the size of the payload to be held within the external containment apparatus, and thus the corresponding size of the external containment apparatus, external containment apparatus may attach to one or more of undersides 225, 230, and 235 of UAV 100.

Figure 4:
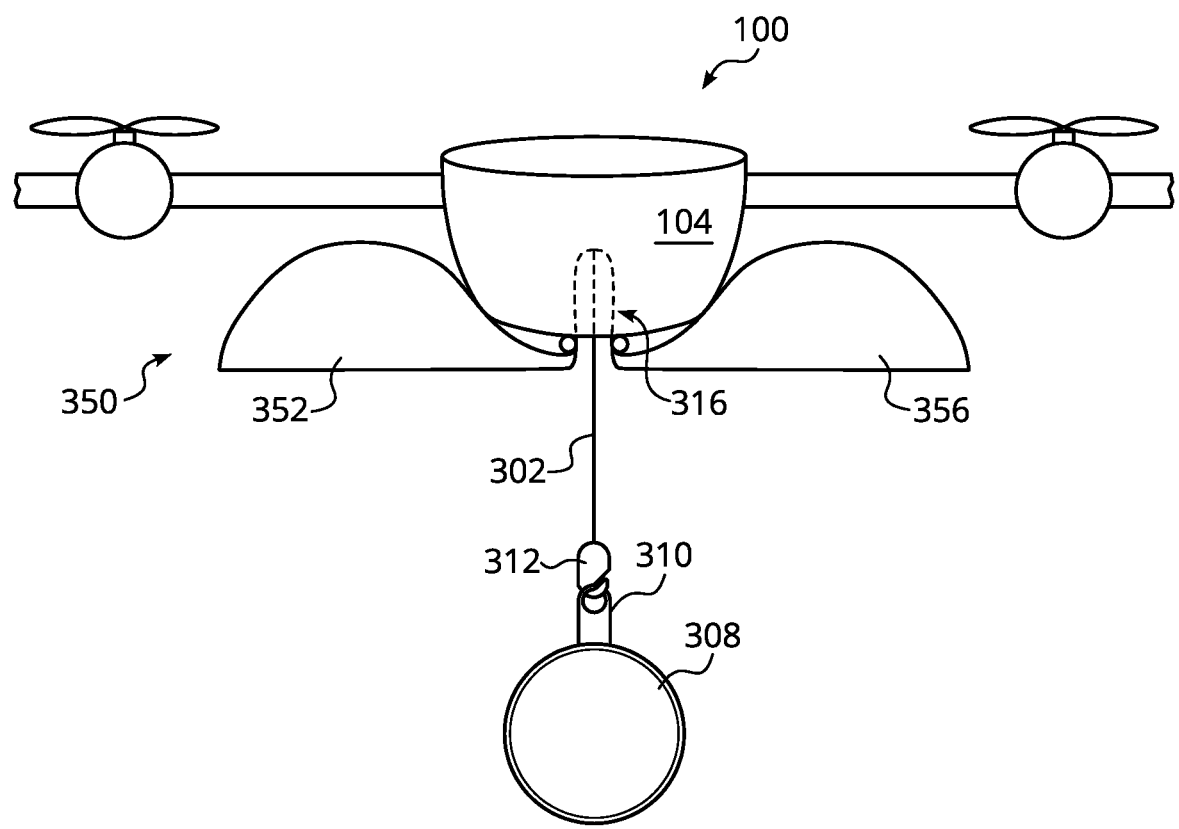
FIG. 4 depicts a front view of the UAV and external containment apparatus, according to an embodiment of the disclosure.

Payload 308 may be at a random orientation relative to external containment apparatus 350 during pick-up, delivery, and/or lowering or raising of the payload. In FIG. 3B, payload 308, which, as an example, may comprise a long or elongated payload such as a French baguette, is shown be in an orientation that is not aligned with the second/closed position of the external containment apparatus 350. Nevertheless, during raising of the payload 308 toward UAV 100, payload 308 is (re)oriented to properly align with the external containment apparatus 350, as shown in FIG. 4. FIG. 4 depicts a front view of the UAV 100 and external containment apparatus 350. The long axis of the payload 308 may be aligned with the center axis of the UAV 100. By the time payload coupling apparatus 314 is fully received by the receptacle 316, payload 308 is in proper orientation relative to the external containment apparatus 350. External containment apparatus 350 is configured to be long or elongated into the page in FIG. 4, and hence, the long or elongated side of the payload 308 is also oriented to be into the page so as to align the payload 308 shape with the external containment apparatus 350 shape. In some embodiments, proper orientation of the payload 308 to the external containment apparatus 350 may be achieved passively from the shape of the payload coupling apparatus 314 and receptacle 316. Alternatively, active orientation schemes may be employed to achieve the desired orientation.

With payload 308 and external containment apparatus 350 in alignment with each other, UAV 100 may complete winching up the payload 308 to a transporting position (e.g., complete locating capsule 312 within receptacle 316) and changing the external containment apparatus 350 from the first position to the second position around the payload 308. Positions of the external containment apparatus 350 may be controlled by mechanical actuators, use of sensors, and/or controllers included in the avionics module 215.

FIGS. 5A-5B depict front and side views, respectively, of the external containment apparatus 350 in the second/closed position with payload 308 enclosed therein. In some embodiments, one or more portions of payload 308 may be in contact with the interior of external containment apparatus 350 and/or at least be partially supported by the external containment apparatus 350. Alternatively, payload 308 may be supported by UAV 100 (via a latching mechanism (e.g., payload loop 310)) and/or not contact the external containment apparatus 350. With payload 308 now encapsulated in an aerodynamic shell, UAV 100 may fly payload 308 from a pick-up location to a delivery location without unduly reducing UAV range.

External containment apparatus 350 may include a first opening, adjacent to the opening of receptacle 316 at the underside of UAV 100, and a second opening at a side opposite the first opening. A center of the first opening may be aligned (or substantially aligned) with a center of the opening of receptacle 316. A center associated with the second opening may also align (or substantially align) with the center of the opening of the receptacle 316. In some embodiments, the size and position of the first and second openings of the external containment apparatus 350 may be configured so that the payload coupling apparatus 314 (as well as associated structures such as the tether 302) of UAV 100 may pass through the first and second openings to couple with payload 308 while the external containment apparatus 350 remains attached to the UAV 100. The second opening of the external containment apparatus 350 may also be configured so that payload 308 may be winched up or down relative to UAV 100 and to locate the payload 308 inside or outside of the external containment apparatus 350. Payload coupling apparatus 314 may remain through the first opening to suspend the payload 308 below the UAV 100 while the payload 308 is inside the external containment apparatus 350 and/or while the UAV 100 is flying to the delivery location.

For external containment apparatus 350, for example, first opening is included at a top side between hinges 354, 358. First and second portions 352, 356 configured in the first position (e.g., open position as shown in FIG. 3A) creates the second opening of the external containment apparatus 350. The size and alignment of the first and second openings are such that payload coupling apparatus 314 passes through the first opening, the second opening, and then to payload 308. Second opening is also configured so that payload 308 can be raised up and located within external containment apparatus 350 when in the second position (e.g., closed position as shown in FIG. 5A), and lowered and located outside of external containment apparatus 350 when in the first position (e.g., open position). In an external containment apparatus comprised of more than one portion, the second opening may cease to exist when in the second position (e.g., closed position).

More than one size or shape of payloads may be transported within an external containment apparatus by implementation of modular external containment apparatuses. In some embodiments, external containment apparatus 350 may be attachable and detachable from UAV 100 and interchangeable with a different external containment apparatus. Each external containment apparatus of a plurality of external containment apparatuses may have an aerodynamic shape and be particularly configured for the shape and size of payload to be transported. Each external containment apparatus of the plurality of external containment apparatuses may attach and detach from UAV 100 using any of a variety of securement mechanisms such as, but not limited to, screws, compression tabs, latches, and the like. The plurality of external containment apparatuses may selectively attach and detach from the UAV 100 via a common coupler mechanism.

Figure 6A:
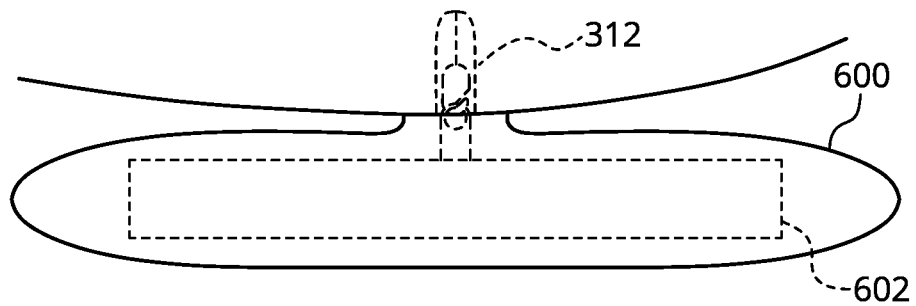
FIGS. 6A-6E depict examples of external containment apparatuses, according to alternative embodiments of the disclosure.
Figure 6B:
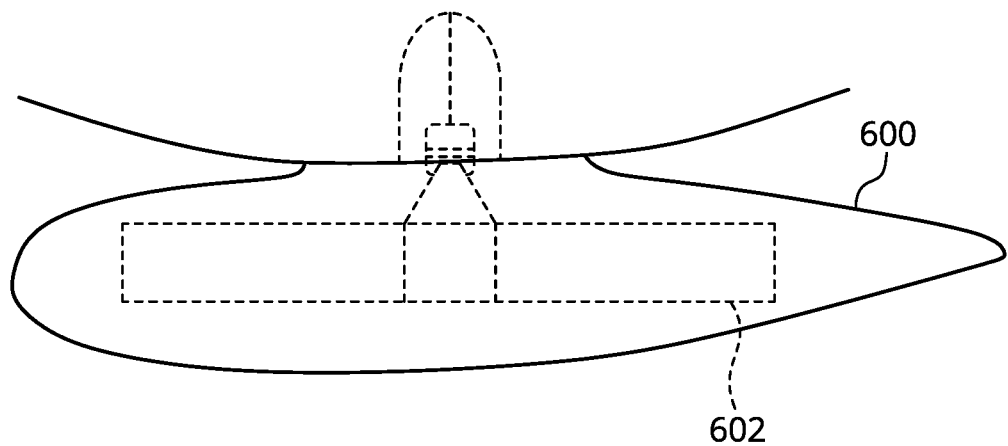

FIGS. 6A-6E depict examples of external containment apparatuses, according to alternative embodiments of the present disclosure. FIGS. 6A-6B depict front and side views, respectively, of an external containment apparatus 600 configured to transport a payload 602 having wide sides such as a pizza box. While external containment apparatus 600 retains a teardrop aerofoil shape in the side view, the front side may comprise a stretch out teardrop shape resembling an ellipse or oval to provide sufficient space for the wide side dimension of payload 602.

Figure 6C:
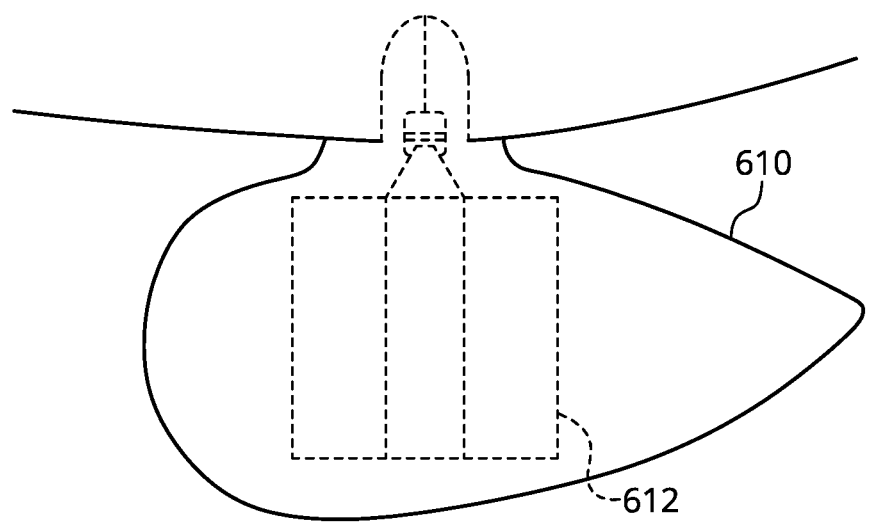
Figure 6D:
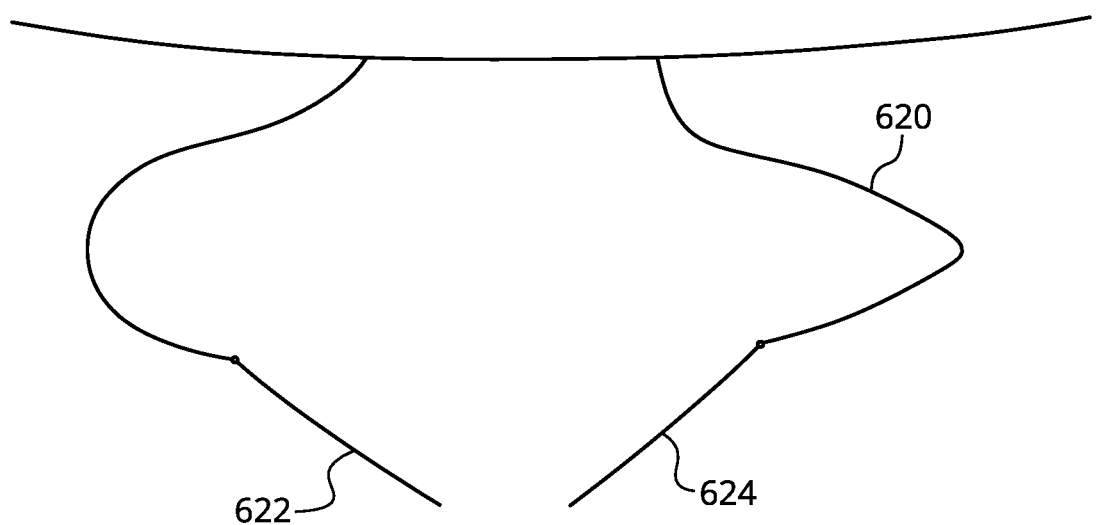
Figure 6E:
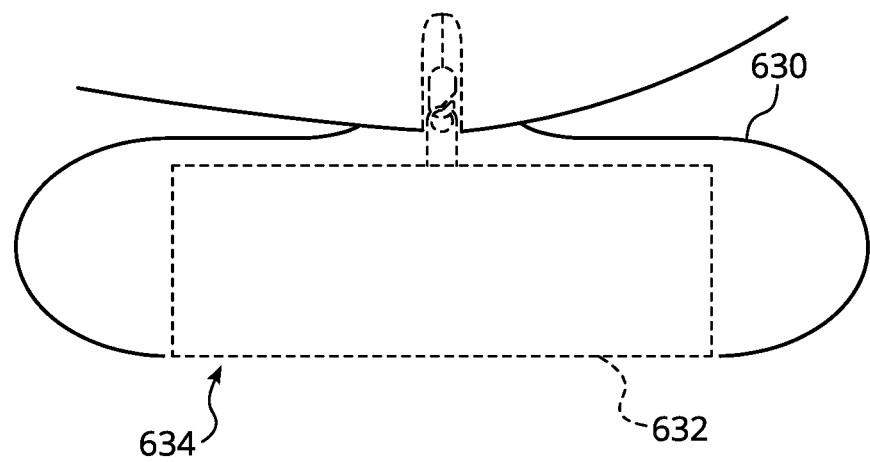

FIG. 6C depicts a side view of an external containment apparatus 610 associated with a payload 612 having a height or thickness greater than payload 308 or 602. For example, payload 612 may comprise a shoe box or cube shape. External containment apparatus 610 may have a substantially aerodynamic shape, in which the height or thickness of the teardrop shape may be extended relative to external containment apparatus 350. FIG. 6D depicts a side view of an external containment apparatus 620 including a door or pair of doors, such as doors 622, 624. In some embodiments, external containment apparatus 620 may comprise a unitary structure with one or more doors through which a payload may enter or exit. With doors 622, 624 in the closed position, external containment apparatus 620 may comprise an aerodynamic shape. FIG. 6E depicts a front view of an external containment apparatus 630 including an opening 634 through which a payload 632 may enter or exit the external containment apparatus 630. The external surfaces of the external containment apparatus 630 conform to a substantially aerodynamic shape.

One or more of external containment apparatuses 600, 610, 620, 630 may comprise a unitary structure in contrast to the multi-portioned structure (e.g., first and second portions 352, 356) of external containment apparatus 350. Each of the external containment apparatuses of FIGS. 6A-6E includes first and second openings to permit functionalities of the payload coupling apparatus and positioning of the payload inside or outside of the external containment apparatus. For certain unitary external containment apparatuses, such as apparatus 630 of FIG. 6E, for example, the second opening (e.g., opening 634) may be present at all times rather than disappearing depending on the particular position of the external containment apparatus.

Figure 7:
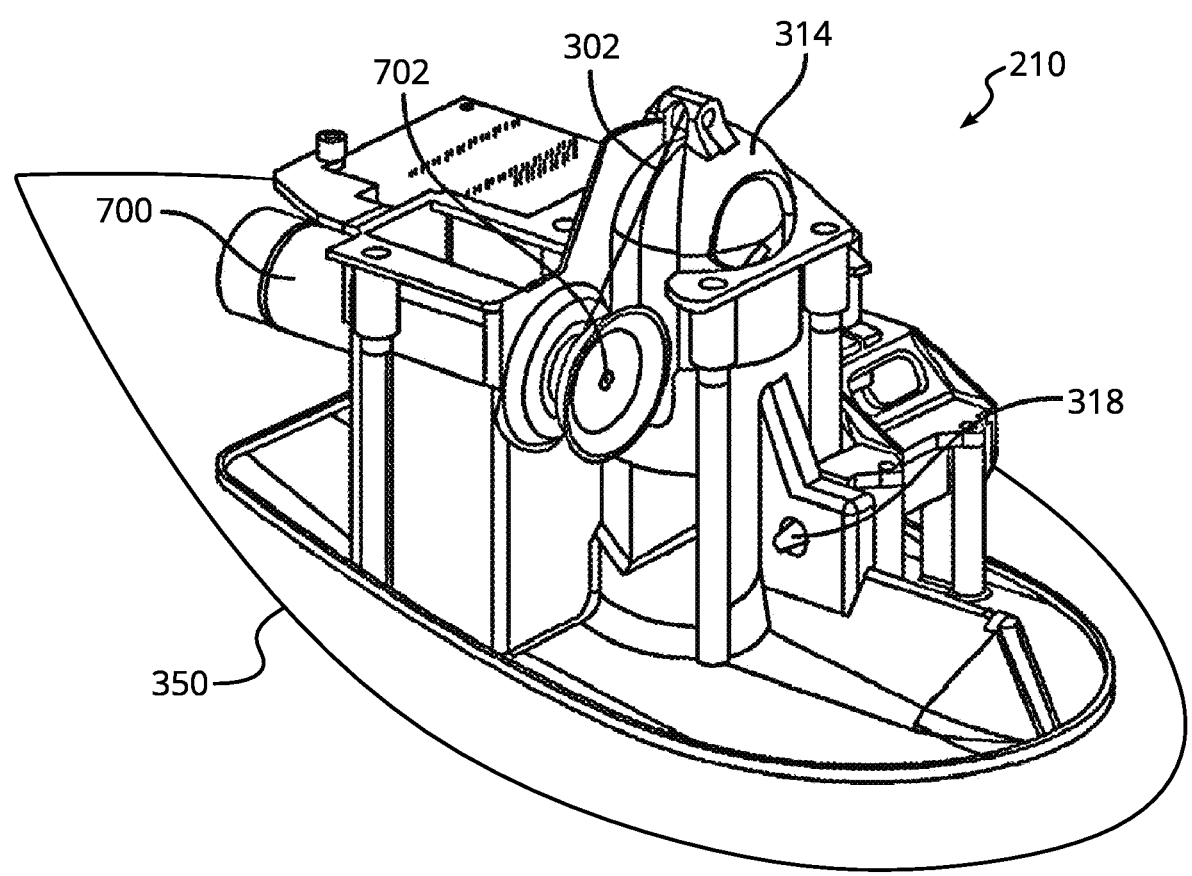
FIG. 7 depicts a perspective view of a mission payload module with the attached external containment apparatus, according to some embodiments of the disclosure.

FIG. 7 depicts a perspective view of an embodiment of the mission payload module 210 with the attached external containment apparatus 350, according to some embodiments of the present disclosure. Mission payload module 210 may include a winch or spool 702 powered by a motor 700, and the tether 302 to be spooled by the spool 702. As mentioned above, tether 302 is attached to the payload coupling apparatus 314. Selective actuation of the motor 700 may be used to lower or raise payload coupling apparatus 314 relative to the mission payload module 210.

FIGS. 3A-5B and 7 show a UAV 100 that includes a payload delivery system (also be referred to as a payload delivery apparatus), according to some embodiments. As shown, payload delivery system for UAV 100 includes the external containment apparatus 350 enclosing the payload 308 during transport, tether 302 coupled to the spool 702, payload latch 318, and payload 308 coupled to the tether 302 via the payload coupling apparatus 314. The payload latch 318 can function to alternately secure payload 308 and release the payload 308 upon delivery. For instance, as shown, the payload latch 318 may take the form of one or more pins that can engage the payload coupling apparatus 314 (e.g., by sliding into one or more receiving slots in the payload coupling apparatus 314). Inserting the pins of the payload latch 318 into the payload coupling apparatus 314 may secure the payload coupling apparatus 314 within a receptacle 316 on the underside of the UAV 100, thereby preventing the payload 308 from being lowered from the UAV 100. In some embodiments, the payload latch 318 may be arranged to engage the spool 702 or the payload 308 rather than the payload coupling apparatus 314 in order to prevent the payload 308 from lowering. In other embodiments, the UAV 100 may not include the payload latch 318, and the payload delivery system may be coupled directly to the UAV 100.

In some embodiments, the spool 702 can function to unwind the tether 302 such that the payload 308 can be lowered to the ground with the tether 302 and the payload coupling apparatus 314 from UAV 100. The payload 308 may itself be an item for delivery, and may be housed within (or otherwise incorporate) a parcel, container, wrapper, or other structure that is configured to interface with the payload latch 318. In practice, the payload delivery system of UAV 100 may function to autonomously lower payload 308 to the ground in a controlled manner to facilitate delivery of the payload 308 on the ground while the UAV 100 hovers above.

Payload latch 318 may be in a closed position (e.g., pins engaging the payload coupling apparatus 312) to hold the payload 308 against or close to the bottom of the UAV 100 during flight from a launch site to a target location. The target location may be a point in space directly above a desired delivery location. Then, when the UAV 100 reaches the target location, the UAV's control system may toggle the payload latch 318 to an open position (e.g., disengaging the pins from the payload coupling apparatus 314), thereby allowing the payload 308 to be lowered from the UAV 100. The UAV's control system may also actuate opening of the external containment apparatus 350, or alternatively, toggling of the payload latch 318 to the open position may also cause opening of the external containment apparatus 350. The control system may further operate the spool 702 (e.g., by controlling motor 700 in FIG. 7) such that the payload 308, secured to the tether 302 by a payload coupling apparatus 314, is lowered to the ground.

Once the payload 308 reaches the ground, the control system may continue operating the spool 702 to lower the tether 302, causing over-run of the tether 302. During over-run of the tether 302, the payload coupling apparatus 314 may continue to lower as the payload 308 remains stationary on the ground. The downward momentum and/or gravitational forces on the payload coupling apparatus 314 may cause the payload 308 to detach from the payload coupling apparatus 314 (e.g., by sliding off a hook of the payload coupling apparatus 314). After releasing payload 308, the control system may operate the spool 702 to retract the tether 302 and the payload coupling apparatus 314 toward the UAV 100. Once the payload coupling apparatus 314 reaches or nears the UAV 100, the control system may operate the spool 702 to pull the payload coupling apparatus 314 into the receptacle 316, and the control system may toggle the payload latch 318 to the closed position.

In some embodiments, when lowering the payload 308 from the UAV 100, the control system may detect when the payload 308 and/or the payload coupling apparatus 314 has been lowered to be at or near the ground based on an unwound length of the tether 302 from the spool 702. Similar techniques may be used to determine when the payload coupling apparatus 314 is at or near the UAV 100 when retracting the tether 302. The UAV 100 may include an encoder for providing data indicative of the rotation of the spool 702. Based on data from the encoder, the control system may determine how many rotations the spool 702 has undergone and, based on the number of rotations, determine a length of the tether 302 that is unwound from the spool 702. For instance, the control system may determine an unwound length of the tether 302 by multiplying the number of rotations of the spool 702 by the circumference of the tether 302 wrapped around the spool 702. In some embodiments, such as when the spool 702 is narrow or when the tether 302 has a large diameter, the circumference of the tether 302 on the spool 702 may vary as the tether 302 winds or unwinds from the tether, and so the control system may be configured to account for these variations when determining the unwound tether length.

In other embodiments, the control system may use various types of data, and various techniques, to determine when the payload 308 and/or payload coupling apparatus 314 have lowered to be at or near the ground. Further, the data that is used to determine when the payload 308 is at or near the ground may be provided by sensors on UAV 100, sensors on the payload coupling apparatus 314, and/or other data sources that provide data to the control system.

In some embodiments, the control system itself may be situated on the payload coupling apparatus 314 and/or on the UAV 100. For example, the payload coupling apparatus 314 may include logic module(s) implemented via hardware, software, and/or firmware that cause the UAV 100 to function as described herein, and the UAV 100 may include logic module(s) that communicate with the payload coupling apparatus 314 to cause the UAV 100 to perform functions described herein.

In some embodiments, UAV 100 may be able to pick up and deliver payload 308 without landing. In some examples, UAV 100 may be able to raise and lower a payload coupled to a tether by winding and unwinding the tether while hovering. As such, the UAV may pick up and deliver the payload without requiring infrastructure to be set up by a merchant or customer, thereby increasing flexibility of delivery location and/or payload geometry and decreasing or eliminating costs associated with the manufacture or installation of infrastructure. In other examples, the UAV may be configured to land on various elevated structures, such as a perch or shelf, and, from its elevated landing position, pick up or deliver the payload by winding or unwinding the tether.

Figure 8:
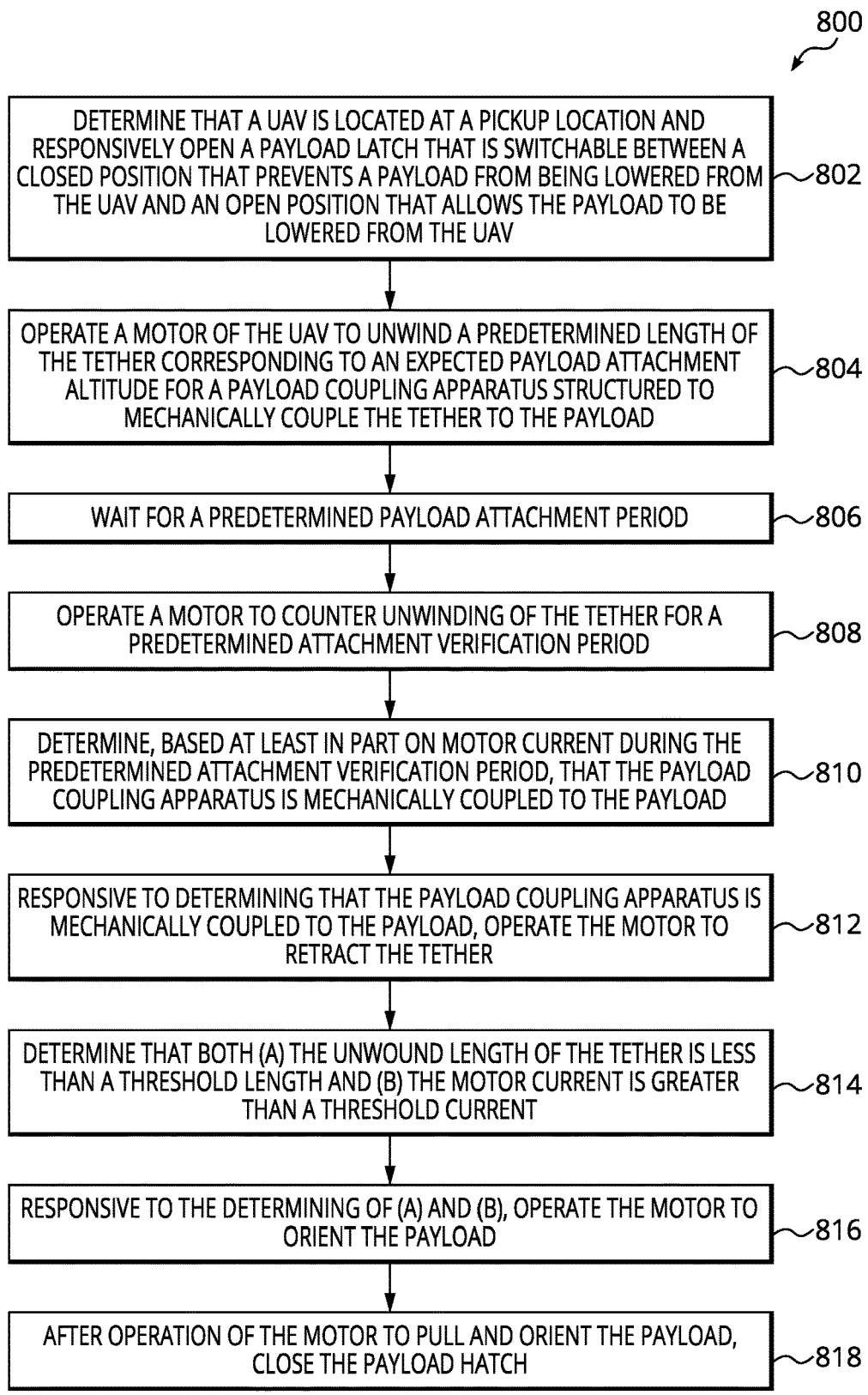
FIG. 8 depicts a flow diagram showing a process for tethered pickup of a payload for subsequent delivery to a target location, according to some embodiments of the disclosure.

FIG. 8 depicts a flow diagram showing a process 800 for tethered pickup of a payload (e.g., a package) for subsequent delivery to a target location, according to some embodiments. Process 800 may be carried out by a UAV such as those described elsewhere herein (e.g., UAV 100). For example, process 800 may be carried out by a control system of a UAV with a winch system. Further, the winch system may include a tether disposed on a spool, a motor operable in a first mode and a second mode that respectively counter and assist unwinding of the tether due to gravity (e.g., by driving the spool forward or in reverse), a payload coupling apparatus that mechanically couples the tether to a payload, and a payload latch switchable between a closed position that prevents the payload from being lowered from the UAV and an open position that allows the payload to be lowered from the UAV.

As shown in block 802, when the UAV arrives at a pickup location (also referred to as a source location), the UAV's control system may open the payload latch and the external containment apparatus (if the external containment apparatus has open and closed positions), such that the tether and the payload coupling apparatus can be lowered toward the ground at the pickup location.

At block 804, the control system operates the motor to unwind a predetermined length of the tether. This unwound length may correspond to an expected payload attachment altitude for the payload coupling apparatus, which is attached to the lower end of the tether. The payload attachment altitude may be an altitude at which a human, or perhaps a robotic device, may grab the payload coupling apparatus for attaching the coupling apparatus to a payload. For instance, the payload attachment altitude may be an altitude less than two meters above ground level. Other examples are possible as well.

After unwinding the predetermined length of the tether, the control system may wait for a predetermined payload attachment period, as shown at block 806. This attachment period allows time for a human, or perhaps a robotic device, to attach a payload (e.g., a package for delivery) to the payload coupling apparatus. The predetermined payload attachment period may be a fixed value or may vary based on an operational state of the UAV.

When the payload attachment period ends, the control system may operate the winch motor in the second mode for a predetermined attachment verification period, as shown at block 808. In particular, the motor may operate so as to pull upwards on the tether during the attachment verification period in order to hold the tether in place or retract the tether at a certain rate. The motor current required to hold the tether in place or retract the tether at a certain rate will be greater when the payload is attached, due to the added weight of the payload. As such, the control system may determine, based at least in part on motor current during the predetermined attachment verification period, whether or not the payload coupling apparatus is mechanically coupled to the payload, as shown at block 810.

In practice, for instance, if the motor current is less than an attachment threshold current, the control system may determine that the payload has not been attached to the payload coupling apparatus, and may repeat the process of lowering the payload (this time by some predetermined additional length), waiting for a predetermined payload attachment period, and then pulling upwards on the tether to test for payload attachment, as shown at blocks 804 to 810. On the other hand, if the motor current is greater than or equal to the attachment threshold current, and block 810 results in a determination that the payload coupling apparatus is mechanically coupled to the payload, the control system may operate the winch motor to retract the tether and lift the attached payload towards the UAV, as shown at block 812.

The control system may continue retracting the tether until it senses that the payload coupling apparatus is at or near the UAV, at which point it initiates actions to secure the payload for flight to the target location. For instance, process 800 includes functions that may be used to secure a package and a coupling apparatus in a receptacle of a UAV, such as in the configurations shown in FIGS. 3A-5B.

More specifically, at block 814, the control system may determine that both: (a) the unwound length of tether is less than a threshold length and (b) the motor current is greater than a threshold current. When both these conditions hold true, this may serve as an indication that the payload coupling apparatus and/or the payload have reached the UAV receptacle. In particular, when the calculated unwound length of tether is at or near zero, this may indicate that the payload coupling apparatus and/or the payload have been lifted all the way to the UAV. Further, when the payload coupling apparatus and/or the payload contact the UAV's receptacle area, the motor current may increase as the motor's speed controller attempts to continue pulling the payload upward. And, by considering both these indications, the control system may avoid false positives.

Thus, upon detecting both of the above-described indications, the control system may responsively operate the motor in the first mode to pull the payload into, and orient the payload relative to, the receptacle on the lower surface of the UAV, as shown at block 816. In particular, the control system may operate the motor to increase the torque applied to the tether, such as by increasing the current supplied to the motor to a predetermined value, in order to help ensure that at least the payload coupling apparatus is firmly seated against the corresponding surfaces of the UAV's receptacle, such that the payload latch (e.g., payload latch 318 pins) can be closed to secure the payload for flight to the target location. Orientation of the payload relative to the UAV may be configured to also orient the payload relative to an external containment apparatus. Accordingly, after applying torque to the tether in an upward direction for a predetermined period of time, the control system may close the payload latch and the external containment apparatus (if the external containment apparatus has open and close positions), as shown at block 818. With the payload secured for flight and enclosed by an aerodynamic enclosure, the UAV may navigate to a target location for delivery.

Figure 9:
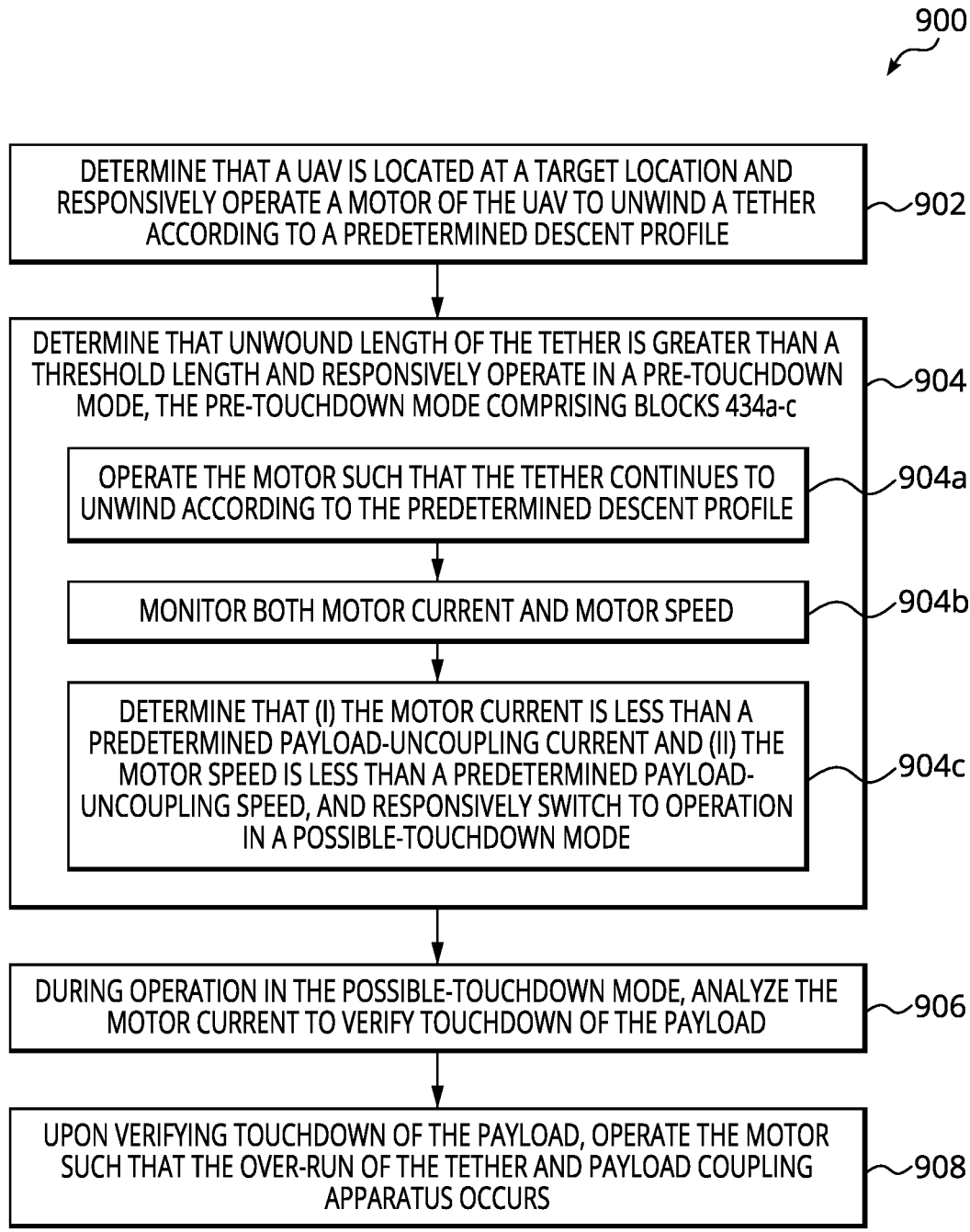
FIG. 9 depicts a flow diagram showing a process for operation of a UAV in a delivery mode, according to some embodiments of the disclosure.

Once the UAV arrives at the target location for delivery, the UAV's control system may responsively operate in a delivery mode. FIG. 9 depicts a flow diagram showing a process 900 for operation of a UAV in a delivery mode, according to some embodiments.

More specifically, once the UAV arrives at and is hovering over a target location for tethered delivery, the UAV's control system may operate the motor to unwind the tether according to a predetermined descent profile, at block 902. The predetermined descent profile may control a descent rate of the payload by specifying a desired rotational speed of the motor. For example, the descent profile may specify a constant descent rate or a variable descent rate for the duration of the payload descent. The UAV's control system directly or indirectly may also open the external containment apparatus (if the external containment apparatus has open and close positions).

In some examples, the desired rotational motor speeds specified by the predetermined descent profile could be based on machine-learned data that could be inferred from data from prior flights. For example, for delivery to a particular location, the control system could use a descent profile that was previously used during a previous delivery to the particular location. Alternatively, if use of the descent profile during a previous delivery to that particular location or some other location resulted in one or more detected errors (e.g., failure to detach the payload from the tether, damaged payload, etc.), then the control system could alter the descent profile (e.g., by increasing or decreasing the desired motor speeds during various phases of the payload descent) or choose to use a default descent profile instead.

In an example, the control system may not exert significant control over the descent of the payload until it is closer to the ground. For instance, at some point while the tether is unwinding, the control system may determine that the unwound length of the tether is greater than a threshold length, and responsively operate in a pre-touchdown mode, as shown at block 904. The threshold length may correspond to a predetermined near-ground altitude of the payload; e.g., a height where more control is desirable for the safety of bystanders and/or ground structures, and/or to protect the payload and its contents from damage.

As noted, in the pre-touchdown mode, the control system may pay close attention to the payload to improve the chances of successful release of the payload on the ground. In particular, while operating in the pre-touchdown mode, the control system operates the motor such that the tether continues to unwind according to the predetermined descent profile, as shown at block 904a, while monitoring both motor current and motor speed, as shown at block 904b. The motor current may be compared to a predetermined payload-uncoupling current to detect when the motor current is less than the predetermined payload-uncoupling current. Additionally, the motor speed may be compared to a predetermined payload-uncoupling speed to detect when the motor speed is less than the predetermined payload-uncoupling speed, as shown at block 904c. When both the motor current is less than a predetermined payload-uncoupling current and the motor speed is less than a predetermined payload-uncoupling speed, the control system responsively switches to operation in a possible-touchdown mode.

The possible-touchdown mode may be implemented in an effort to verify that the package has, in fact, reached the ground (or put another way, to help prevent false positive detection of contact with the ground). For instance, while operating in the possible-touchdown mode, the control system may analyze the motor current to verify that the motor current remains below the predetermined payload-uncoupling current for a touchdown-verification period (e.g., perhaps allowing for a small amount of fluctuation during this period), as shown at block 906. In practice, a Schmitt trigger may be applied to verify that the detected drop in motor current to below the payload-uncoupling threshold is not the result of noise or some temporary blockage, and is in fact due to the payload resting on the ground. Other techniques for verifying touchdown of the payload are also possible.

Once touchdown of the payload is verified, the control system operates the motor such that over-run of the tether and payload coupling apparatus occurs, as shown at block 908. Over-run occurs when the payload comes to a rest while the tether continues to unwind. In practice, for example, the control system may switch the winch motor from the first mode to the second mode by, e.g., reversing the direction the motor and thus the direction of torque applied to the tether by the motor. Thus, the motor may switch from slowing the descent of the tether to forcing the tether to unwind such that over-run of the tether occurs. The over-run of the tether may in turn lower the payload coupling apparatus below a height where coupling to the payload occurs (and perhaps all the way to the ground). In other embodiments, block 908 may involve the control system simply turning the motor off, and allowing gravity to pull the payload coupling apparatus down and cause the tether over-run.

Further, the payload and/or payload coupling apparatus may have interfacing surfaces such that the interaction of the payload and payload coupling apparatus during over-run deflects the payload coupling apparatus to the side of the payload. As such, the coupling feature of the payload coupling apparatus (e.g., a hook) will no longer be aligned with a corresponding coupling feature of the payload (e.g., a handle on a tote package). Located as such, the winch system may retract the tether and payload coupling apparatus to the UAV without the payload coupling apparatus re-coupling to the payload, thereby leaving the package on the ground.

In some examples of process 900, the control system may be configured to, prior to opening the payload latch, operating the motor to apply an upward force on the tether. This may allow for the payload latch to be opened more easily, as the payload may be arranged to rest some or all of its weight on the payload latch when the latch is in the closed position. The weight of the payload may increase the friction against the payload latch when attempting to switch the latch to the open position, so lifting the payload a predetermined amount may reduce occurrences of the payload latch getting stuck in the closed position. Additionally, after opening the payload latch and before unwinding the tether, the control system may be configured to operate the motor to hold the tether in a substantially constant position. This may allow the weight of the payload to pull the payload downward and against the payload coupling apparatus, causing the payload to become firmly seated in a coupling mechanism (e.g., a hook) of the payload coupling apparatus.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible machine-readable storage medium includes any mechanism that provides (e.g., stores) information in a non-transitory form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A system for transporting a payload, comprising:
an unmanned aerial vehicle (UAV) including a payload coupling apparatus; and
a containment apparatus having an aerodynamic exterior and a hollow interior, wherein the aerodynamic exterior includes first and second openings, wherein the containment apparatus is located external to the UAV, and wherein the containment apparatus is selectively attached to an underside of the UAV,
wherein the payload coupling apparatus passes through the first and second openings of the containment apparatus to couple with the payload, and the payload passes through the second opening to be positioned inside or outside the hollow interior of the containment apparatus.

2. The system of claim 1, wherein the containment apparatus comprises a first containment apparatus and further comprising a second containment apparatus different from the first containment apparatus, wherein the second containment apparatus is attached to the underside of the UAV and the first containment apparatus is detached from the UAV.

3. The system of claim 2, wherein the first containment apparatus is configured for a first payload and the second containment apparatus is configured for a second payload having a different shape or size from the first payload.

4. The system of claim 1, wherein the payload coupling apparatus passes through the first opening when the payload is positioned inside the containment apparatus.

5. The system of claim 1, wherein the containment apparatus includes first and second portions, each of the first and second portions pivotally attached to the underside of the UAV, and wherein the containment apparatus is configurable in an open position when the first and second portions are separated from each other and configurable in a closed position when the first and second portions are in contact with each other.

6. The system of claim 5, wherein the second opening of the containment apparatus is absent when the containment apparatus is in the closed position.

7. The system of claim 1, wherein the containment apparatus comprises a unitary structure.

8. The system of claim 1, wherein the first opening is provided at a first side of the containment apparatus adjacent to the underside of the UAV and the second opening is provided at a second side different from the first side of the containment apparatus.

9. The system of claim 1, wherein the aerodynamic shape comprises a substantially teardrop aerofoil shape.

10. The system of claim 1, wherein the payload has one or both of a size larger than a payload space internal to the UAV and a non-aerodynamic shape.

11. A payload containment apparatus comprising:
an aerodynamic exterior;
a hollow interior; and
first and second openings included at the aerodynamic exterior, wherein the aerodynamic exterior selectively attaches to an unmanned aerial vehicle (UAV), and
wherein a payload coupling apparatus included in the UAV passes through the first and second openings of the containment apparatus to couple with a payload, and the payload passes through the second opening to be positioned inside or outside the hollow interior.

12. The apparatus of claim 11, further comprising a coupling mechanism configured to selectively attach and detach the aerodynamic exterior with the UAV.

13. The apparatus of claim 12, wherein the coupling mechanism comprises a coupling mechanism common to a plurality of payload containment apparatuses with the UAV, and wherein each payload containment apparatus of the plurality of payload containment apparatuses is associated with a particular size or shape of payload to be transported within the respective payload containment apparatus.

14. The apparatus of claim 11, wherein the payload coupling apparatus passes through the first opening when the payload is positioned within the hollow interior.

15. The apparatus of claim 11, wherein the aerodynamic exterior comprises first and second portions, each of the first and second portions pivotally attached to an underside of the UAV, and wherein the first and second portions are configurable in an open position when the first and second portions are separated from each other and configurable in a closed position when the first and second portions are in contact with each other.

16. The apparatus of claim 15, wherein the second opening is absent when the first and second portions are in the closed position.

17. The apparatus of claim 11, wherein the aerodynamic exterior comprises a unitary structure.

18. The apparatus of claim 11, wherein the first opening is provided at a first side of the aerodynamic exterior adjacent to an underside of the UAV and the second opening is provided at a second side different from the first side of the aerodynamic exterior.

19. The apparatus of claim 11, wherein the aerodynamic exterior comprises a substantially teardrop aerofoil shape.

20. The apparatus of claim 11, wherein the payload has one or both of a size larger than a payload space internal to the UAV and a non-aerodynamic shape.

* * * * *